Dec. 16, 1969   J. D. GORDON   3,483,981
COOKING OIL CLEANER
Filed Sept. 25, 1967

INVENTOR.
*Jerry D. Gordon*
BY
*Young & Thompson*
ATTORNEYS 3,483,981
COOKING OIL CLEANER
Jerry D. Gordon, 10749 E. 11th St.,
Tulsa, Okla. 74128
Filed Sept. 25, 1967, Ser. No. 670,233
Int. Cl. B01d 21/24, 21/10
U.S. Cl. 210—167                                       3 Claims

ABSTRACT OF THE DISCLOSURE

A cooking oil cleaner comprises a drain rack on an inclined drain pan, with a screen beneath the drain pan and a settling basin beneath the screen. An overflow weir leads to a sump from which a pump removes the oil through a filter for reuse. The parts are all readily removable without tools, to facilitate cleaning.

---

Figures 1, 2:
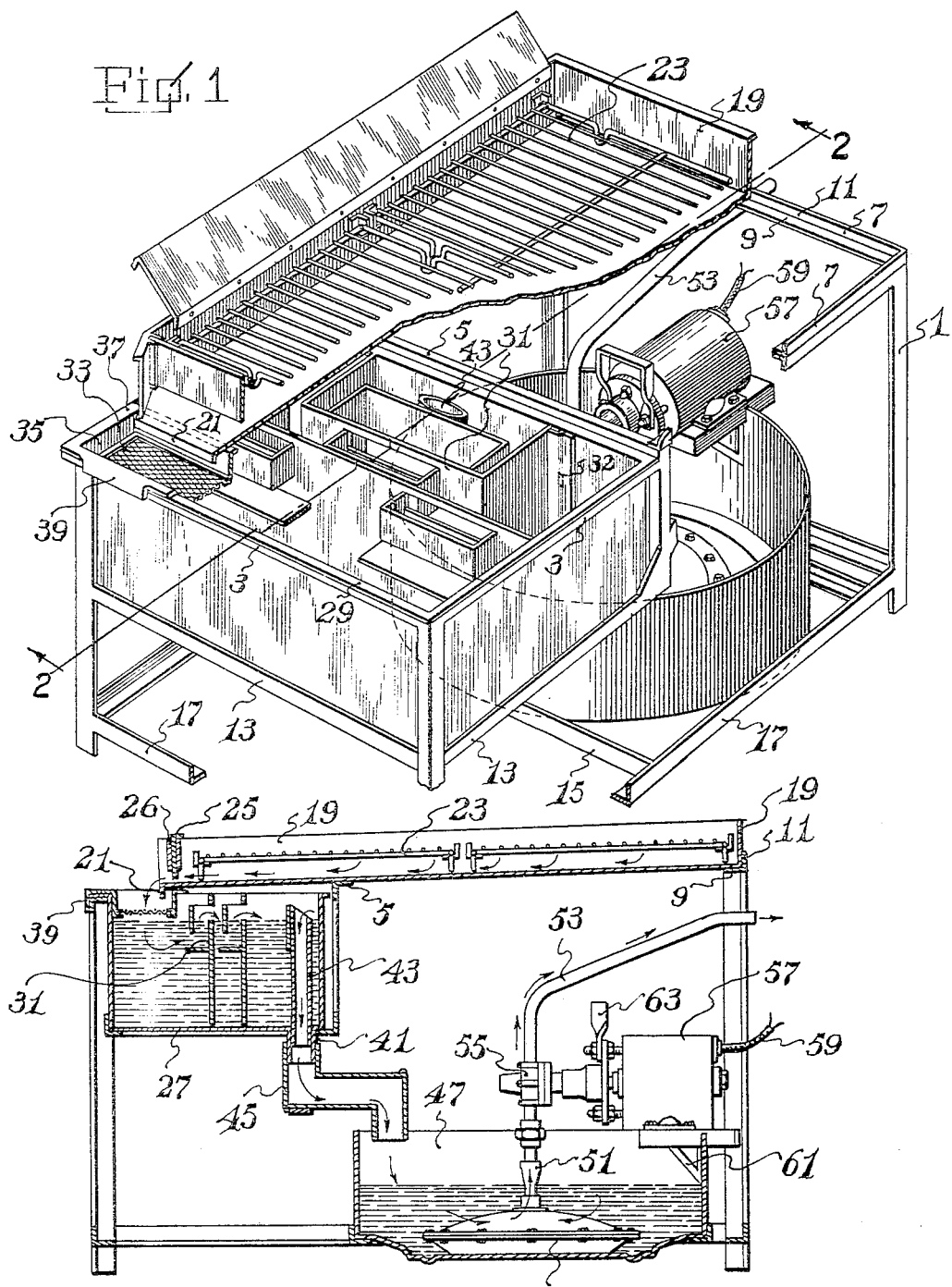

The present invention relates to cooking oil cleaners, more particularly of the type in which foods such as those deep fried in cooking oils are drained of excess oil, and the oil that drains from them is cleaned for reuse.

It is an object of the present invention to provide a cooking oil cleaner by which a large proportion of the cooking oil that is drained from food can be reused.

Another object of the present invention is the provision of a cooking oil cleaner in which all the parts are readily removable for cleaning, without the need for tools.

Finally, it is an object of the present invention to provide a cooking oil cleaner which will be relatively simple and inexpensive to construct, easy to install, maintain, clean, repair and operate, and rugged and durable in use.

Further objects and advantages will become apparent from a consideration of the following description, taken in connection with the accompanying drawing, in which:

FIGURE 1 is a perspective view of a cooking oil cleaner according to the present invention, with parts broken away for clarity; and FIGURE 2 is a side cross-sectional view of a cooking oil cleaner according to the present invention.

Referring now to the drawing in greater detail, there is shown a cooking oil cleaner according to the invention, comprising an open metal frame 1 adapted to rest on the floor on legs. Frame 1 includes a plurality of horizontal members 3 which form the upper edges of one end of the frame and are disposed in the shape of a U and have their upper edges disposed in a common horizontal plane. A transverse frame member 5 extends across the width of frame 1 and has its upper surface disposed at a level which is a little higher than that of the members 3. Horizontal members 7 are disposed in U-shaped configuration opening toward the members 3 and comprise the upper edges of the other end of the frame. The members 7 have their lower flanges 9 at a level higher than the highest portion of member 5, and also have upright flanges 11 that outwardly border the members 7.

Further frame members 13 with upstanding outer flanges and inwardly directed horizontal flanges form an open subframe within frame 1; and still further transverse frame members 15 extend from side to side of the horizontal frame members 17 at the bottom of the frame and have outer upright flanges and lower horizontal flanges that extend toward each other. Frame 1 is thus strongly cross-braced by these additional members.

A removable drain pan 19 rests by gravity on frame 1. The flanges 9 on which the rear end of drain pan 19 rests are disposed at a higher level than the surfaces on which the forward end of drain pan 19 rests. As a result, the bottom of drain pan 19 is inclined downwardly to the left as seen in FIG. 2. Drain pan 19 has upstanding side walls on three of its sides, but at its lower end (the left end in FIG. 2) it is provided with a lip 21 over which oil may flow. The food to be drained is carried on wire draining racks 23 that rest by gravity on the bottom of pan 19. A baffle 25 extends across the lower or discharge end of drain pan 19 with its lower edge spaced a short distance above pan 19, to prevent food from rolling off racks 23 and over the lip 21. Baffle 25 is vertically slidably and removably mounted at its ends in vertical slideways 26.

A settling basin 27 rests along its bottom edges on members 13 and has laterally outwardly extending flanges 29 about its upper edges, by which it rests on the members 3. Settling basin 27 is in the form of a generally rectangular open-topped container and is provided with a labyrinthine series of overflow weirs and baffles 31 over and under which cooking oil must pass along its path through basin 27. Weirs and baffles 31 are vertically slidably and removably mounted in vertical slideways 32.

A horizontal screen 33 is disposed at the bottom of an open rectangular frame 35 which has upright side walls and horizontally outwardly extending flanges 37 about its upper edges. Flanges 37 rest by gravity on flanges 29 of settling basin 27. In addition, one of the flanges 37 includes a downwardly directed lip 39 that overlies the edge of the subjacent flange 29 and accurately locates screen 33 beneath the lip 21 of drain pan 19 and prevents screen 33 from sliding lengthwise of the frame.

Settling basin 27 is provided at its discharge end with a downwardly depending cylindrical sleeve 41, in which is slidably disposed an upright cylindrical overflow tube 43. The lower end of overflow tube 43 is slidably disposed in sleeve 41 with a friction grip that ensures that tube 43 will maintain any vertically adjusted position in sleeve 41, but at the same time will be readily detachable from sleeve 41. The liquid level in basin 27 can thus be adjusted by vertically adjusting tube 43.

Similarly, an elbow tube 45 is slidably disposed on the outer surface of sleeve 41, with a friction fit that keeps the tube in place in normal use but permits ready detachment of the tube for disassembly and/or cleaning. Elbow tube 45 discharges into a reservoir 47 that rests by gravity on frame members 15 and 17. A filter 49 is disposed in the bottom of reservoir 47 and is interconnected by taper joint 51 with the lower end of a discharge conduit 53. A pump 55 is disposed in conduit 53 for drawing oil from reservoir 47 through filter 49 and forcing it through conduit 53 back to the cookers (not shown). A motor 57 drives pump 55 and may be supplied with electric current from a power line 59. Motor 57 rests by gravity on a side wall of reservoir 47 through a bracket 61; and a handle 63 is provided, so that the motor can simply be lifted off the reservoir and removed for disassembly and/or cleaning of the unit. The pump 55 and conduit 53 are removable as a unit with the motor, the taper joint 51 permitting disassembly in a vertical direction simply by lifting, leaving the filter 49 behind in reservoir 47.

It will thus be appreciated that all the parts rest by gravity on each other, or are interconnected by simple friction joints. The unit is thus disassemblable and reassemblable without the use of any tools.

The apparatus of the present invention can thus be readily cleaned by unskilled food service personnel, simply by lifting the various parts off each other or sliding them apart, cleaning them, and then putting them back in place. For example, the racks 23 can simply be lifted out of the pan 19, which in turn can be lifted off the frame. The screen 33 can then be simply lifted out, and the elbow tube 45 can be slipped off and the settling basin 27 lifted out. When the settling basin 27 is empty, its overflow tube 43 can be slid out. Moreover, the baffles and weirs 31 are vertically slidable into and out of place so as to be readily removed for cleaning and replaced afterward. Finally, the motor 57 and its associated parts can be lifted away from the taper joint 51 by handle 63, and the filter 49 can be lifted out of reservoir 47 and the reservoir 47 itself lifted out off the frame members 15. After cleaning, reassembly can of course be effected in the reverse order.

From a consideration of the foregoing disclosure, therefore, it will be evident that all of the initially recited objects of the present invention have been achieved.

Having described my invention, I claim:

1. A cooking oil cleaner, comprising a frame supporting a drain pan inclined downwardly toward one end, a screen disposed below said one end of the drain pan, a settling basin disposed beneath said screen, an overflow conduit in said settling basin, a reservoir for cooking oil communicating with said overflow conduit to receive cooking oil from said overflow conduit, means for removing cooking oil from said reservoir, rack means resting by gravity on said drain pan and having openwork rack surfaces spaced above the bottom of said drain pan, a baffle spaced a short distance above the bottom of the drain pan at said one end of the drain pan to retain pieces of food in the drain pan but to permit cooking oil to drain below the baffle, vertical slideways in which the baffle is removably mounted, said settling basin resting removably by gravity in said frame, said settling basin having outwardly extending flanges about its upper edges, said flanges resting on upper surfaces of said frame, an open frame having upright side walls, said screen closing the bottom of said open frame, said open frame having horizontally outwardly extending flanges about the tops of said side walls by which said open frame rests by gravity on said settling basin flanges, baffle means in said settling basin providing a labyrinthine passage for cooking oil through the settling basin, vertical slideways in which said baffle means are removably mounted, said overflow conduit being a vertical tube having open upper and lower ends, and a sleeve on the bottom of said settling basin in which said tube is vertically slidably mounted.

2. A cooking oil cleaner as claimed in claim 1, and a bracket that rests by gravity on a side wall of said reservoir, a pump for removing oil from said reservoir, a motor for driving said pump, said motor and pump being mounted on said bracket for removal from said cleaner as a unit.

3. A cooking oil cleaner as claimed in claim 1, and a filter disposed in the bottom of said reservoir, a discharge conduit for removing oil from said reservoir, and a taper joint between said filter and said discharge conduit such that said discharge conduit can be disassembled from said filter by lifting said discharge conduit away from said filter.

References Cited

UNITED STATES PATENTS

| | | | |
|---|---|---|---|
| 1,234,131 | 7/1917 | Cleveland | 99—408 X |
| 2,229,610 | 1/1914 | Nicholoy | 210—316 X |
| 3,123,455 | 3/1964 | Paasche | 210—167 X |
| 3,156,177 | 11/1964 | Sanders | 99—408 X |
| 3,159,095 | 12/1964 | Wagner | 99—408 |
| 3,160,588 | 12/1964 | Alarie | 210—167 X |
| 3,341,016 | 9/1967 | Paasche | 210—73 |

REUBEN FRIEDMAN, Primary Examiner

FRANK A. SPEAR, JR., Assistant Examiner

U.S. Cl. X.R.

99—355, 408; 210—255, 316, 300, 416